US012557719B1

(12) United States Patent
Keigley et al.

(10) Patent No.: US 12,557,719 B1
(45) Date of Patent: Feb. 24, 2026

(54) SPOILS SIFTING AND GROUND SURFACE PREPARATION APPARATUSES AND SYSTEMS

(71) Applicant: ABI ATTACHMENTS, INC., Mishawaka, IN (US)

(72) Inventors: Kevin V. Keigley, Osceola, IN (US); Nathaniel Lee Smith, Goshen, IN (US)

(73) Assignee: ABI Attachments, Inc., Mishawaka, IN (US)

( * ) Notice: Subject to any disclaimer, the term of this patent is extended or adjusted under 35 U.S.C. 154(b) by 538 days.

(21) Appl. No.: 18/057,995

(22) Filed: Nov. 22, 2022

(51) Int. Cl.
*A01B 49/02* (2006.01)
*A01B 29/04* (2006.01)
*E02F 3/76* (2006.01)

(52) U.S. Cl.
CPC .......... *A01B 49/027* (2013.01); *A01B 29/048* (2013.01); *E02F 3/7663* (2013.01)

(58) Field of Classification Search
CPC ..... A01B 49/027; A01B 49/02; A01B 29/048; A01B 29/06; E02F 3/7663; E02F 3/7672; E02F 5/027172
See application file for complete search history.

(56) References Cited

U.S. PATENT DOCUMENTS

| | | | |
|---|---|---|---|
| 5,515,625 A | 5/1996 | Keigley | |
| 5,806,605 A * | 9/1998 | Keigley | A01B 49/02 172/449 |

| | | | |
|---|---|---|---|
| 6,206,106 B1 * | 3/2001 | Heckendorf | E01C 23/082 172/799.5 |
| 7,055,698 B1 | 6/2006 | Keigley | |
| 7,478,682 B1 * | 1/2009 | Keigley | A01B 35/04 172/684.5 |
| 8,534,373 B2 | 9/2013 | Van Buskirk et al. | |
| 9,003,982 B1 * | 4/2015 | Elizalde | A01B 29/048 111/155 |
| 9,826,672 B1 | 11/2017 | Kiser et al. | |
| 10,039,222 B1 * | 8/2018 | Keigley | E02F 3/7663 |
| 10,492,354 B2 | 12/2019 | Keigley | |
| 10,501,912 B2 | 12/2019 | Keigley | |
| 10,508,411 B2 | 12/2019 | Keigley | |
| 10,765,053 B1 * | 9/2020 | Keigley | A01B 31/00 |
| 2002/0144828 A1 * | 10/2002 | Keigley | A01B 31/00 172/197 |
| 2007/0169950 A1 | 7/2007 | Grieshop | |

(Continued)

*Primary Examiner* — Christopher J Sebesta
*Assistant Examiner* — Audrey L Lusk
(74) *Attorney, Agent, or Firm* — ABI Attachments, Inc.

(57) ABSTRACT

A work machine includes a chassis and a lift mechanism. A tow-behind attachment is positioned rearward of the work machine and includes a frame assembly, a spoils rake assembly, and a cage roller assembly. The frame assembly includes a forward portion and a rearward portion. The forward portion is coupled with the chassis and the lift mechanism. The rearward portion is coupled with and moveable to a plurality of positions relative to the forward portion independent of movement of the forward portion relative to the chassis. The spoils rake assembly is coupled with and extends downward from the rearward portion at a position forward of the cage roller assembly and is moveable vertically relative to the rearward portion. The cage roller assembly is coupled with and extends downward from the rearward portion of the frame assembly at a location rearward of the spoils rake assembly.

29 Claims, 8 Drawing Sheets

(56)  References Cited

U.S. PATENT DOCUMENTS

| 2008/0011496 | A1* | 1/2008 | Garrison | ................ | A01B 35/30 |
| | | | | | 172/398 |
| 2012/0017813 | A1 | 1/2012 | Van Buskirk et al. | | |
| 2014/0053762 | A1 | 2/2014 | Van Buskirk et al. | | |
| 2014/0251646 | A1 | 9/2014 | Gray et al. | | |
| 2015/0053433 | A1 | 2/2015 | Kovach et al. | | |
| 2015/0107861 | A1* | 4/2015 | Keigley | .................. | E02F 3/844 |
| | | | | | 172/260.5 |
| 2015/0156962 | A1 | 6/2015 | Zemenchik et al. | | |
| 2016/0338256 | A1* | 11/2016 | Campbell | .............. | A01B 63/22 |
| 2017/0159266 | A1 | 6/2017 | Keigley | | |
| 2018/0230674 | A1 | 8/2018 | Keigley | | |
| 2021/0172149 | A1* | 6/2021 | Keigley | ............... | A01B 63/114 |

* cited by examiner

SPOILS SIFTING AND GROUND SURFACE PREPARATION APPARATUSES AND SYSTEMS

BACKGROUND

The present disclosure relates generally to spoils sifting and ground surface preparation apparatuses and systems. A number of proposals have been made for spoils sifting and ground surface preparation. Heretofore, such proposals have suffered from a number of drawbacks and disadvantages including those respecting the number of passes needed to achieve a desired ground surface preparation and/or spoils sifting state, the number of distinct tools or attachments needed to achieve a desired ground surface preparation and/or spoils sifting. There remains a significant need for the unique embodiments disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Some example embodiments comprise unique ground surface preparation and spoils sifting apparatuses. Some example embodiments comprises unique ground surface preparation and spoils sifting systems Other embodiments, forms, objects, features, advantages, aspects, and benefits shall become apparent from the following description and drawings.

BRIEF DESCRIPTION OF THE DRAWINGS

FIGS. 9, 10, 11 and 12 are partially diagrammatic rear views of portions of a frame assembly and spoils rakes of the example system of FIG. 1.

DETAILED DESCRIPTION OF EXAMPLE EMBODIMENTS

Figure 1:
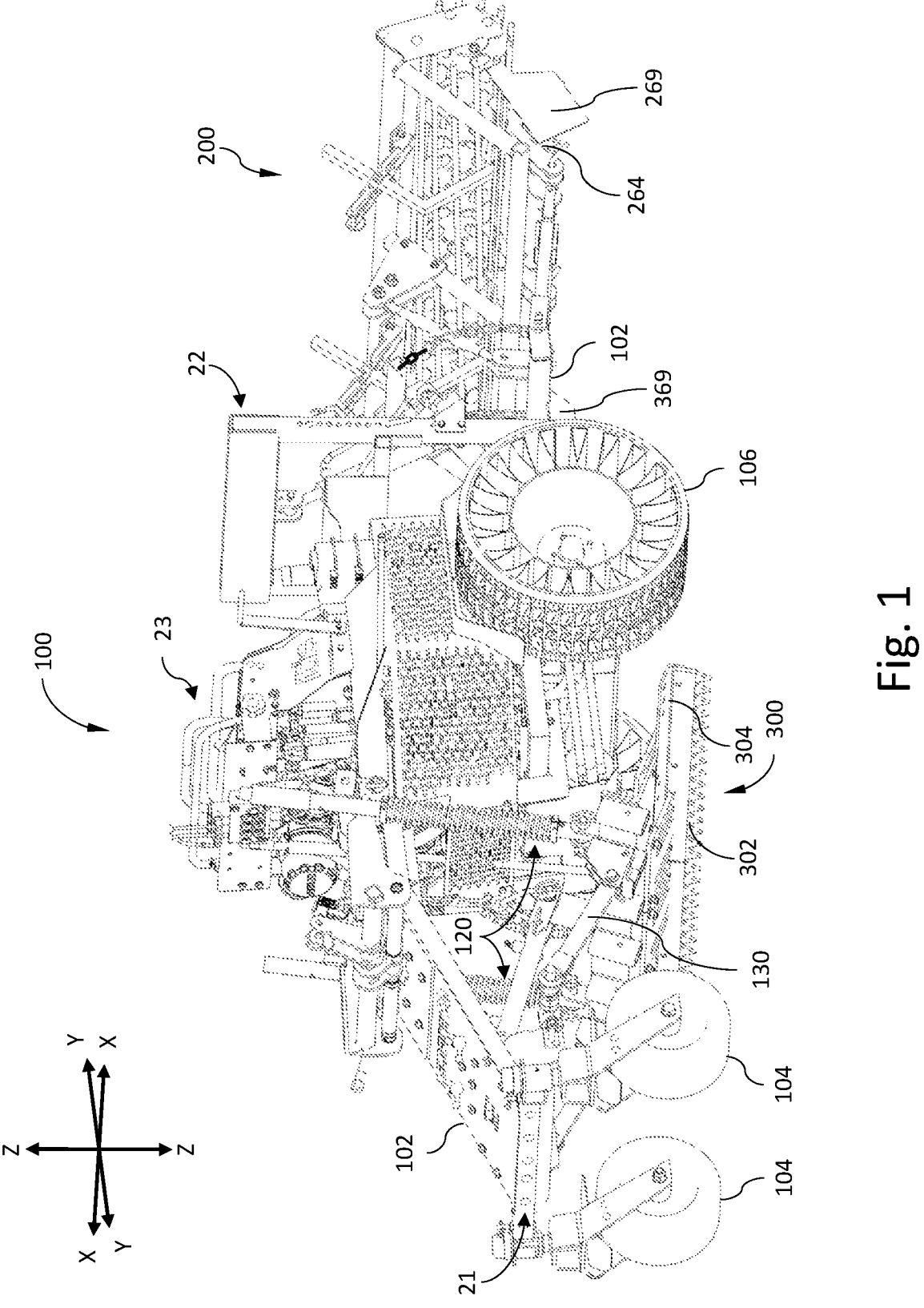
FIG. 1 is a perspective view of an example system including an example work machine and an example a tow-behind attachment 200 and configured for spoils sifting and ground surface preparation.
Figure 2:
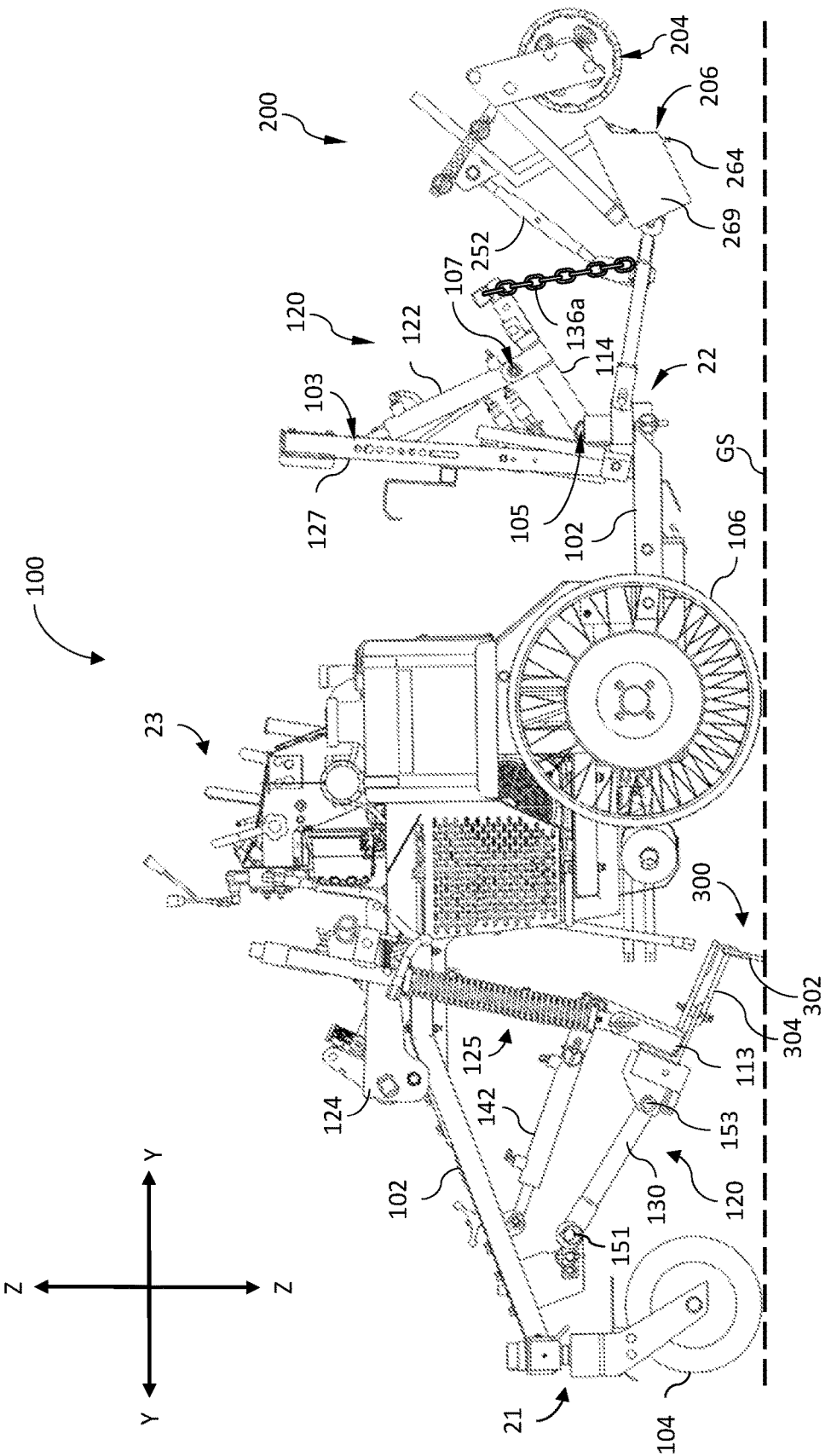
FIG. 2 is a side view of the example system of FIG. 1.
Figure 3:
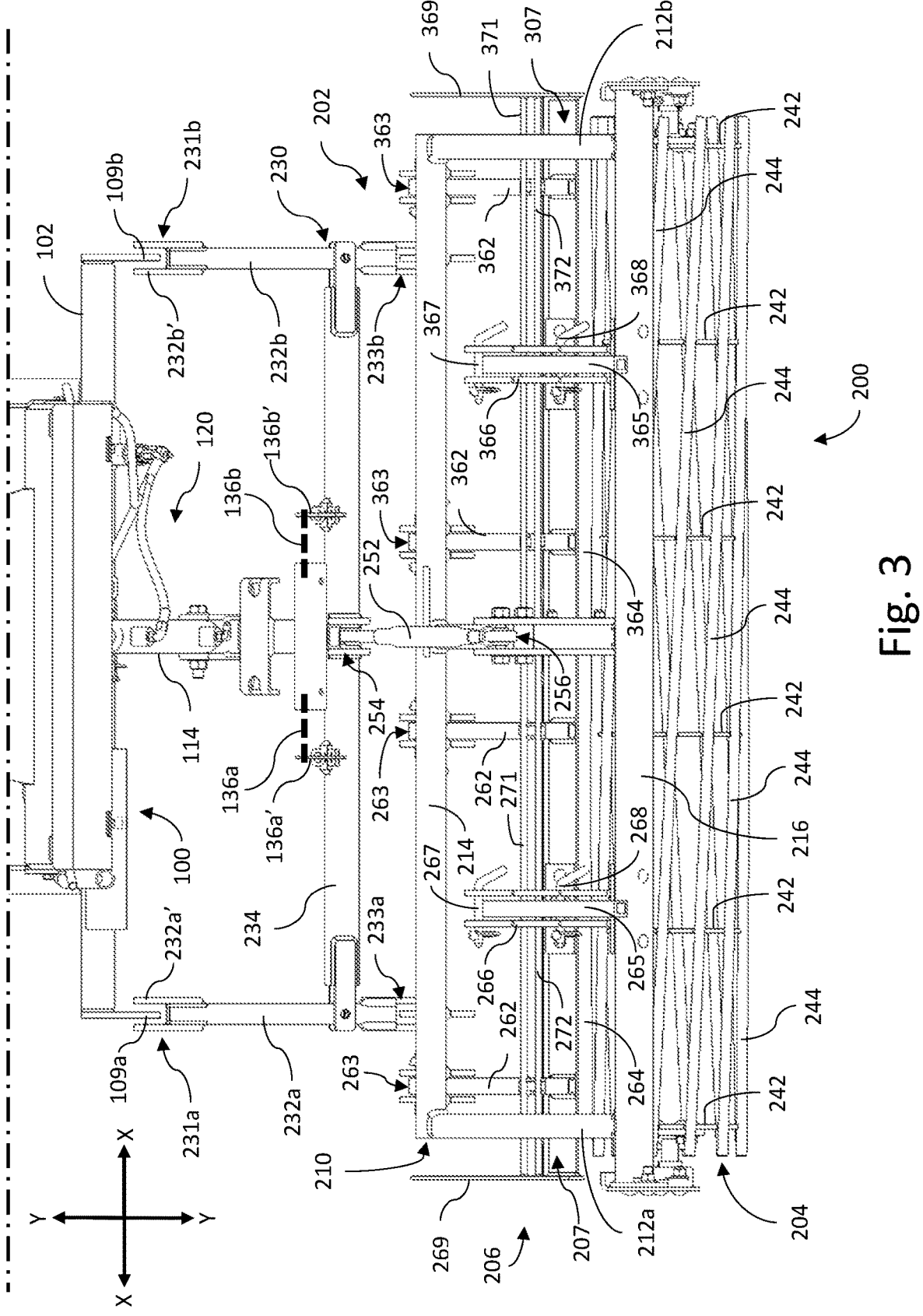
FIG. 3 is a top view of a portion of the example system of FIG. 1.

Referring now to the figures and with initial reference to FIGS. 1 and 2, there is illustrated an example system comprising a work machine 100, a tow-behind attachment 200 (also referred to herein as attachment 200) operatively coupled with work machine 100, and an under-belly attachment 300 (also referred to herein as attachment 300) coupled with work machine 100. Relative to the illustrated X-Y-Z coordinate system, the work machine 100 is provided in a form factor extending along a width in the X-axis direction, a length in the Y-axis direction, and a height in the Z-axis direction. Work machine 100 includes a front end 21 at a forward extremity along its length and a rear end 22 at a rearward extremity along its length.

In the illustrated embodiment, the work machine 100 is provided and configured a self-propelled, zero turn radius work machine. In certain forms, the work machine 100 may be configured as a zero turn radius work machine as described in U.S. Pat. Nos. 9,332,687 and 9,883,621 the disclosures of which are incorporated herein by reference. In other embodiments, various other types of work machines may be utilized.

Work machine 100 includes a chassis 102 supported by front wheels 104 and rear wheels 106 which contact an underlying ground surface GS and support chassis 102. Front wheels 104 and rear wheels 106 are examples of a plurality of rotatable ground-contacting members rotatably coupled with chassis 102 it being appreciated that other types of rotatably ground contacting members such as treads or tracks, may also be utilized in some embodiments. In the illustrated embodiment, front wheels 104 are non-driven wheels and rear wheels 106 are driven wheels. In other embodiment, different arrangement and configurations of driven and non-driven rotatable ground contacting members may be utilized.

Chassis 102 is coupled with and carries an adjustable, suspension-mounted, under-belly attachment mount 113 (also referred to herein as mount 113) which is coupled with pulling linkages 130 at joints 153. Mount 113 is adjustable to rotate or pivot relative to the pulling linkages 130 about joints 153. Pulling linkages 130 are further coupled with chassis 102 at joints 151 allowing rotation of the pulling linkages 130 about joints 151. Attachment 300 is coupled with the mount 113 and extends downward from the mount 113 and the chassis 102 of work machine 100.

Attachment 300 is adjustably coupled and extends downward from with chassis 102. In the illustrated example, attachment 300 is adjustably coupled with a suspension 125. Suspension 125 is adjustably connected to a rocker 124 which is adjustably coupled with chassis 102. The rocker 124 is adjustable to adjust suspension 125 and attachment 300 to a plurality of positions including a raised position, a first lowered position, and a second lowered position. In the raised position, attachment 300 is raised above underlying ground surface GS and suspension 125 is in a first state of compression which may be an uncompressed state or a minimally compressed state. In the first lowered position, attachment 300 is lowered into contact with the underlying ground surface GS and suspension 125 is in the first state of compression. In the first lowered position, attachment 300 is lowered into contact with the underlying ground surface GS and suspension 125 is in a second state of compression comprising greater compression than the first state of compression.

In the illustrated embodiments the suspension 125 is configured as a pair of telescoping cylinders in combination with springs which are compressible between spring mounts through relative motion of the telescoping cylinders. It shall be appreciated that a variety of other suspensions may be utilized in various embodiments in addition to or instead of the illustrated configuration including shock absorbers, elastomeric suspension elements, compressible members, pneumatic suspension elements, hydraulic suspension elements, other spring arrangements and combinations of the foregoing and/or other suspension elements. It shall be further appreciated that a variety of spring mounts may be utilized. In the illustrated embodiments spring mounts are crimped or compressed in place relative to respective shafts or cylinders of a telescoping assembly. In certain embodiments the spring mounts may alternatively or additionally be welded, bonded, bolted or otherwise fixedly coupled with respective suspension elements. Certain embodiments comprise spring mounts adjustably coupled with respective suspension elements, for example, through an axial threaded connection which may utilize one or more lock nuts or other locking members, or by a set screw, pin or bolt.

The attachment 300 is further adjustably coupled with an actuator 142 which is also adjustably coupled with chassis 102. In the illustrated embodiments actuator 142 is configured as a hydraulic cylinder which is configured and operable to expand and contract in a lengthwise direction. The operator controls 23 may be configured to control the supply of pressurized hydraulic fluid to actuator 142 to control its position. Actuator 142 is selectably controllable to expand and contract in a lengthwise direction effective to rotate and change the pitch of under belly attachment 300.

Attachment 300 includes a ground-engaging rake body 302 (also referred to herein as rake body 302) which extends in a downward direction relative to mounting chassis 102. Rake body 302 includes a plurality of triangular ground engaging teeth 304. Ground engaging teeth 304 are preferably configured and provided with preferred dimensions providing unanticipated performance benefits with respect to spoils sifting, ripping of vegetation, and movement of soil with minimized or reduced compaction. In certain preferred forms, ground engaging teeth 304 have a height H of 1.75 inches and a width W of 2 inches. In certain preferred forms, ground engaging teeth 304 have a height H between 1.58 inches and 1.93 inches inclusive and a width W between 1.8 inches and 2.2 inches inclusive.

Attachment 200 includes a frame assembly 202, a roller assembly 204, and a spoils rake assembly 206. Frame assembly 202 incudes a forward portion 230 and a rearward portion 210. Forward portion 230 is coupled with and moveable relative to chassis 102. Rearward portion 210 is coupled with and moveable relative to the forward portion 230. The movement of rearward portion 210 portion relative to forward portion 230 may be independent of movement of forward portion 230 relative to chassis 102. Relative positioning of rearward portion 210 relative to forward portion 230 may be adjusted by adjusting top link 252 which extends between and is coupled with forward portion 230 and rearward portion 210.

Forward portion 230 includes a first linking arm 232a, a second linking arm 232b, and a beam 234 coupled with and extending between the first linking arm 232a and the second linking arm 232b. First linking arm 232a is coupled with the chassis 102 at a first joint 231a and is moveable relative to the chassis 102 about the first joint 231a such that an end of first linking arm 232a distal to first joint 231a is moveable to raise and lower in the Z-axis direction. First joint 231a comprises a moveable coupling of a joint portion 232a' of first linking arm 232a and a first joint portion 109a of chassis 102. It shall be appreciated that joint portion 232a' is an example of a first joint portion configured to mate with a first complimentary joint portion such as to second joint portion 109b form a first joint permitting rotation of the forward portion of a frame relative to the first complimentary joint portion.

Second linking arm 232b is coupled with the chassis 102 at a second joint 231b and is moveable relative to the chassis 102 about the second joint 231b such that an end of second linking arm 232b distal to second joint 231b is moveable to raise and lower in the Z-axis direction. Second joint 231b comprises a moveable coupling of a joint portion 232b' of second linking arm 232b and a second joint portion 109b of chassis 102. It shall also be appreciated that joint portion 232b' is an example of a second joint portion configured to mate with a second complimentary joint portion such as to second joint portion 109b form a second joint permitting rotation of the forward portion of a frame relative to the second complimentary joint portion.

In the illustrated embodiment, first joint 231a and second joint 231b are configured and provided as hinge-type joints wherein joint portion 232a' and first joint portion 109a for a first hinge and joint portion 232b' and second joint portion 109b form a second hinge. In other embodiments, other types of joints coupling and permitting relative motion of forward portion 230 and chassis 102 as described herein may also be utilized.

Rearward portion 210 is coupled with forward portion 230 at a third joint 233a and a fourth joint 233b and is moveable relative to the forward portion 230 to rotate about the third joint 233a and the fourth joint 233b such that an end of rearward portion 210 distal to third joint 233a and fourth joint 233b is moveable to raise and lower in the Z-axis direction.

A top link 252 is coupled with and extends between the forward portion 230 of and the rearward portion 210. Top link is coupled with forward portion 230 at a forward joint 254 and is coupled with rearward portion 210 at a rearward joint 256.

As noted above, top link 252 is extendable and retractable in a lengthwise direction to vary the rotational position of rearward portion 210 relative to forward portion 230. For example, relative to the position of attachment 200 illustrated in FIG. 5, top link 252 may be shortened to rotate rearward portion 210 in a counterclockwise direction relative to the illustrated position effective to increase engagement of spoils rake assembly 206 with underlying ground surface GS. On the other hand, relative to the position of attachment 200 illustrated in FIG. 5, top link 252 may be lengthened to rotate rearward portion 210 in a clockwise direction relative to the illustrated position effective to decrease engagement of spoils rake assembly 206 with underlying ground surface GS. Adjustment of the top link 252 may also change the angle of attack of ground-engaging rake portion 264 of spoils rake 207 and ground-engaging rake portion 364 of spoils rake 307.

In some use cases, adjustment of the top link 252 may be performed to provide fine tuning of the positioning or range of motion of the ground-engaging rake portions 264, 364. Such fine tune adjustment may be performed in combination with setting of upper and lower stops defining a range of motion of ground-engaging rake portions 264, 364 as described herein. Such adjustments may be selected to provide a limited and controllable amount of upward pivoting of ground engaging rake portions 264, 364 to provide a desired amount of soil sifting with sifted soil passing under the ground-engaging rake portions 264, 364 while spoils are retained and carried forward to a desired drop point by the ground-engaging rake portions 264, 364.

In the illustrated embodiment forward joint 254 and rearward joint 256 are configured and provided as hinge-type joints, it being appreciated that other types of joints permitting the described relative rotation of the aforementioned coupled structures may be utilized in other embodiments. Top link 252 is extendable and retractable to vary the rotational position of the rearward portion 210 relative to the forward portion 230. In the illustrated embodiment, top link 252 is configured and provided as a turnbuckle-type top link. In other embodiments, top link 252 may be configured and provided in other forms, such as a hydraulic link, a ratchet link a motor driven link, or other types of top links.

In the illustrated embodiment, third joint 233a and fourth joint 233b are configured and provided as hinge-type joints. In other embodiments, other types of joints coupling and permitting relative motion of rearward portion 210 and forward portion 230 as described herein may also be utilized.

In the illustrated embodiment, third joint 233a is coupled with and located at an end of first linking arm 232a distal to first joint 231a and fourth joint 233b is coupled with and located at an end of second linking arm 232b distal to second joint 231b. In other embodiments, third joint 233a and fourth joint 233b may be coupled with other structures of and located at other positions relative to forward portion 230 including, for example, at positions along beam 234 or other positions along first linking arm 232a and second linking arm 232b.

Rearward portion 210 includes a first side beam 212a, a second side beam 212b, a forward lateral beam 214, and a rearward lateral beam 216. Forward lateral beam 214 extends between and is coupled with first side beam 212a and second side beam 212b. Rearward lateral beam 216 is positioned rearward of the forward lateral beam 214 and extends between and is coupled with first side beam 212a and second side beam 212b.

Roller assembly 204 is coupled with and rotatable relative to rearward portion 210. In the illustrated example, roller assembly 204 is in the form of a cage roller assembly including a plurality of discs 242 and a plurality of bars 244 coupled with peripheral portions of discs 242 and extending between the plurality of discs 242. Roller assembly 204 is configured to rotate relative to rearward portion 210 as attachment 200 is towed by work machine 100.

When attachment 200 is so towed it may advance in a direction of travel of work machine 100. As attachment 200 is so advanced, bars 244 successively contact and work an area of an underlying ground surface that is also worked by ground-engaging rake portion 264 of spoils rake 207 and ground-engaging rake portion 364 of spoils rake 207 to provide a grid-type or waffled elevation or relief pattern of soil working (e.g., soil pulverizing, localized grading, or a combination thereof) of the underlying ground surface. The grid-type or waffled pattern provided by the orientation and positioning of the roller assembly 204 and roller assembly 204. For example, the ground-engaging rake portion 264 of spoils rake 207 and ground-engaging rake portion 364 of spoils rake 207 include teeth oriented to impart peaks and valleys into the underlying ground surface extending generally in the direction of travel of attachment 200 (e.g., in the Y-axis direction if attachment 200 is advanced in a straight line).

It shall be appreciated that the aforementioned working of an underlying ground surface may be beneficially applied to break up larger pieces or clots of soil into smaller pieces. Additionally, the grid-type or waffled elevation or relief pattern of working may be beneficially applied to mitigate erosion, capture and promote absorption of water. The grid-type or waffled elevation or relief pattern of working may also be beneficially applied to aid in retention of material such as seed or fertilizer applied to an underlying ground surface both by providing valleys or depressions in and by actively compressing applied material into an underlying ground surface. Furthermore, the grid-type or waffled elevation or relief pattern of working may be beneficially applied to provide a desired degree of compaction (e.g., percentage area and compression force) of an underlying ground surface. The grid-type or waffled elevation or relief pattern of working may further be beneficially applied to and improve the aesthetics of the underlying ground surface.

Spoils rake assembly 206 includes a spoils rake 207 and a spoils rake 307. Spoils rake 207 includes a pivot arms 262 which are coupled with rearward portion 210 of frame assembly 202 at respective rake joints 263. Pivot arms 262 extend rearward from the rake joints 263 and are rotatable along with the other structures of spoils rake 207 about axes through rake joints 263 generally extending in the illustrated X-axis direction.

Figures 10, 11, 12:
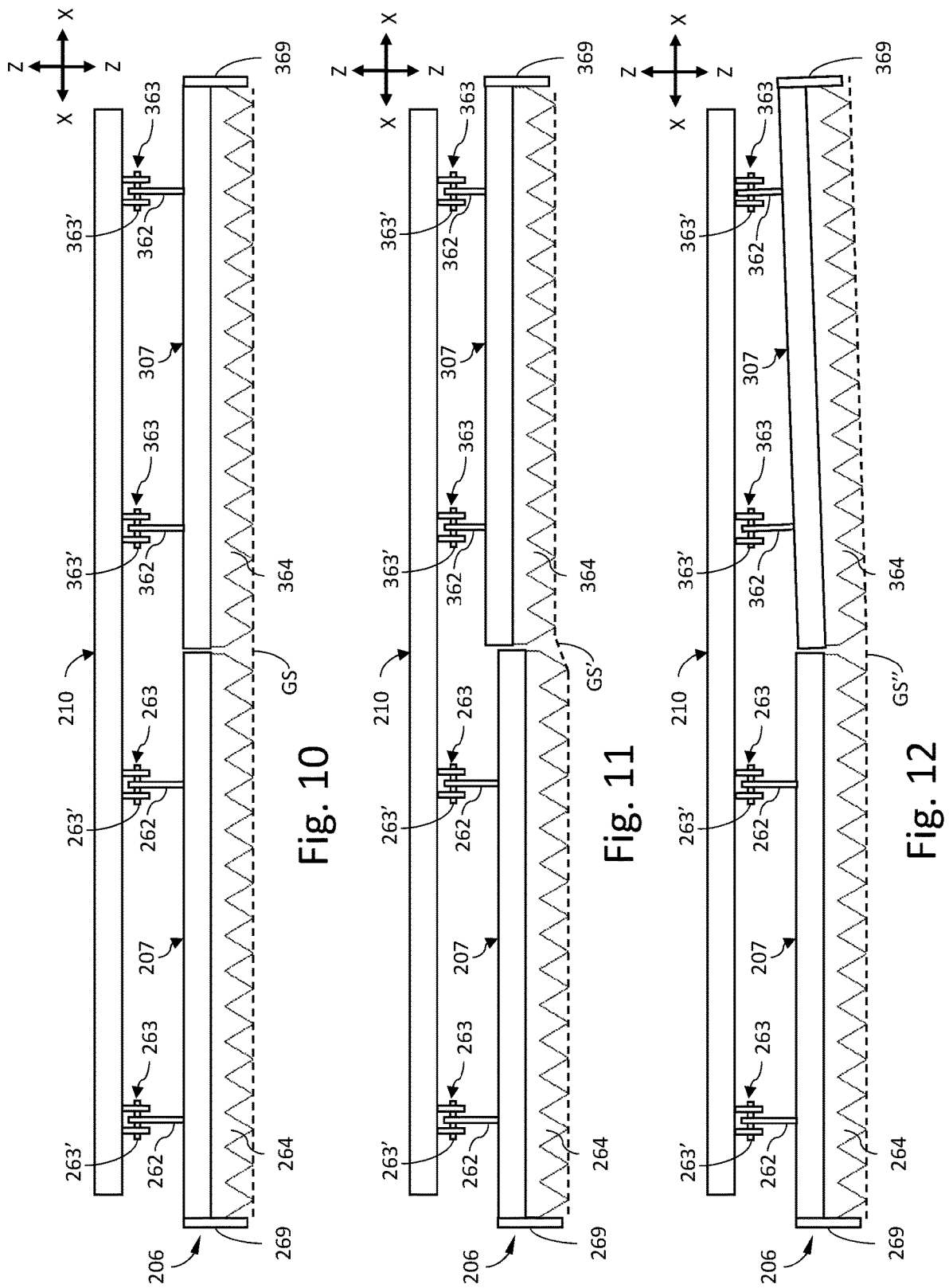

Rake joints 263 are preferably provided and configured as play-added joints wherein a first joint member is undersized or oversized relative to a second joint member providing one or more additional degrees or freedoms of relative motion between the first joint member and the second joint member in addition to the aforementioned rotational degree or freedom of relative motion. For example, as illustrated in FIGS. 10-12, pivot pins 263' extend through apertures in respective pairs of rake joints 263 and distal ends of pivot arms 262. The sizing of at least one of the apertures in rake joints 263 and distal ends of pivot arms 262 is substantially larger than the diameter or maximum received dimension of pivot pins 263' providing a degree or freedom of motion in addition to rotation of pivot arms 262 relative to rake joints 263.

Spoils rake 207 further includes a ground-engaging rake portion 264 (also referred to herein as rake portion 264) which is coupled with and extends downward from the pivot arms 262. Rake portion 264 includes a plurality of triangular ground engaging teeth 292. Ground engaging teeth 292 are preferably configured and provided with preferred dimensions providing unique performance with respect to spoils sifting. In certain preferred forms, ground engaging teeth 292 have a height H of 1.75 inches and a width W of 2 inches. In certain preferred forms, ground engaging teeth 304 have a height H between 1.58 inches and 1.93 inches inclusive and a width W between 1.8 inches and 2.2 inches inclusive.

Spoils rake 207 includes a limiter arm 265 which is coupled with and extends rearward from rake portion 264. Limiter arm 265 is received in a limiter arm receiver 266. In the illustrated embodiment, limiter arm receiver 266 includes spaced-apart elongate vertical members defining a slot there between. A plurality of apertures are defined in the spaced-apart elongate vertical members and are sized and configured to receive upper stop 267 and lower stop 268 and various selectable locations along the height of the spaced-apart elongate vertical members. Upper stop 267 and lower stop 268 delimit a range of motion over which limiter arm 265 can travel.

Upper stop 267 and lower stop 268 are operator-adjustable to a plurality of positions defining different stop heights for the motion of limiter arm 265 and spoils rake 207. By adjusting the apertures in which upper stop 267 is placed, an operator can vary the maximum heights for the motion of limiter arm 265 and spoils rake 207 established by upper stop 267. By removing upper stop 267 entirely, such maximum height can be unlimited by interaction of limiter arm 265 and upper stop 267. By selectably adjusting the apertures in which lower stop 268 is placed, an operator can vary the minimum heights for the motion of limiter arm 265 and spoils rake 207 established by lower stop 268. By removing lower stop 268 entirely, such minimum height can be unlimited by interaction of limiter arm 265 and lower stop 268.

Spoils rake 207 includes side wall 269 which extends in a forward direction of rake portion 264 and extends in a vertical direction with rake portion 264 extending vertically lower than side wall 269. Side wall 269 provides containment of spoils captured by rake portion 264. Spoils rake 207 further includes lateral rods 271, 272 which are coupled with and positioned above pivot arms 262 and are spaced apart from one another and positioned to provide additional sifting of soil carried by spoils rake 207 and limiting passage of spoils over the top of spoils rake 207.

Figure 6:
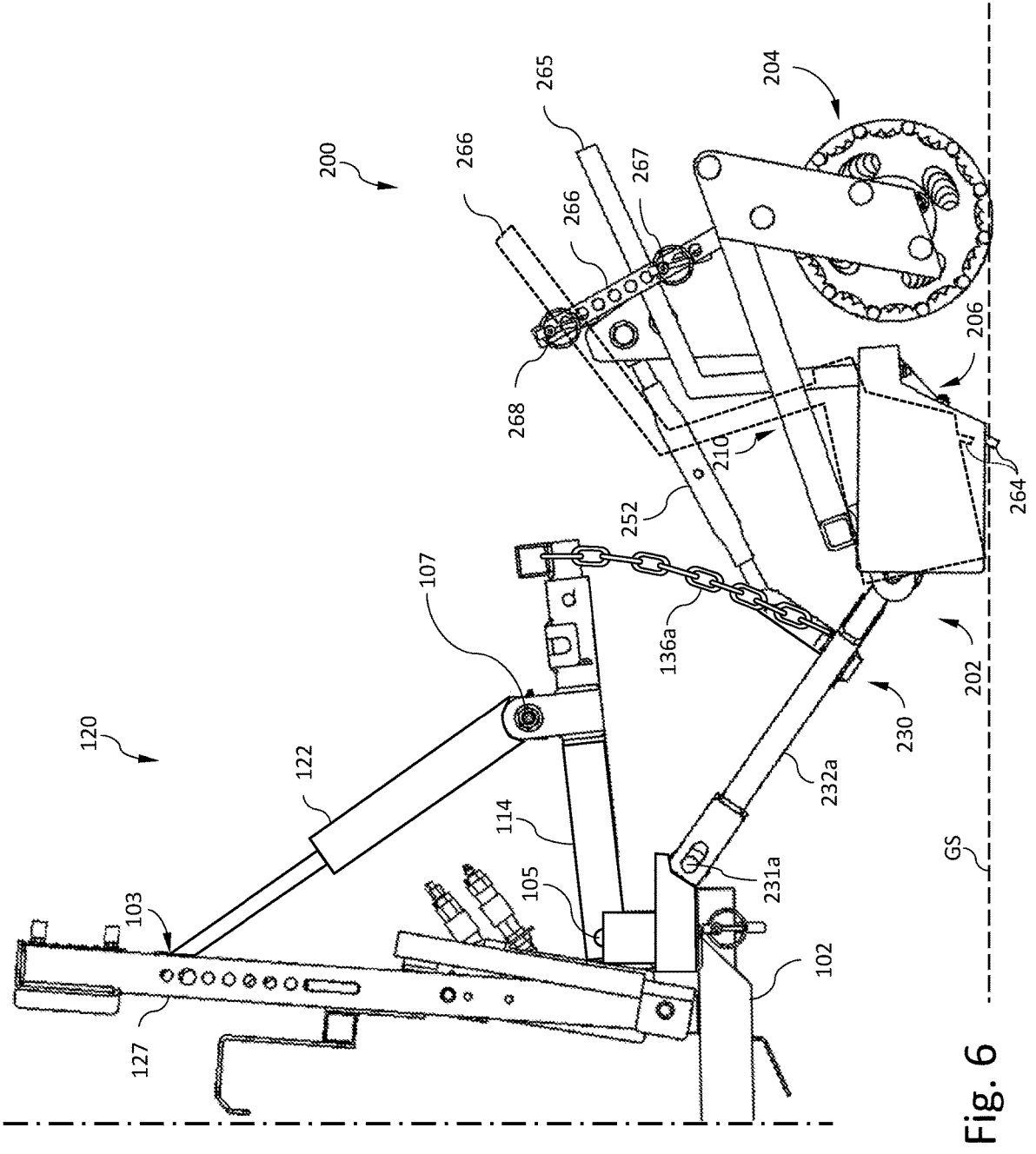
Figures 7, 8, 9:
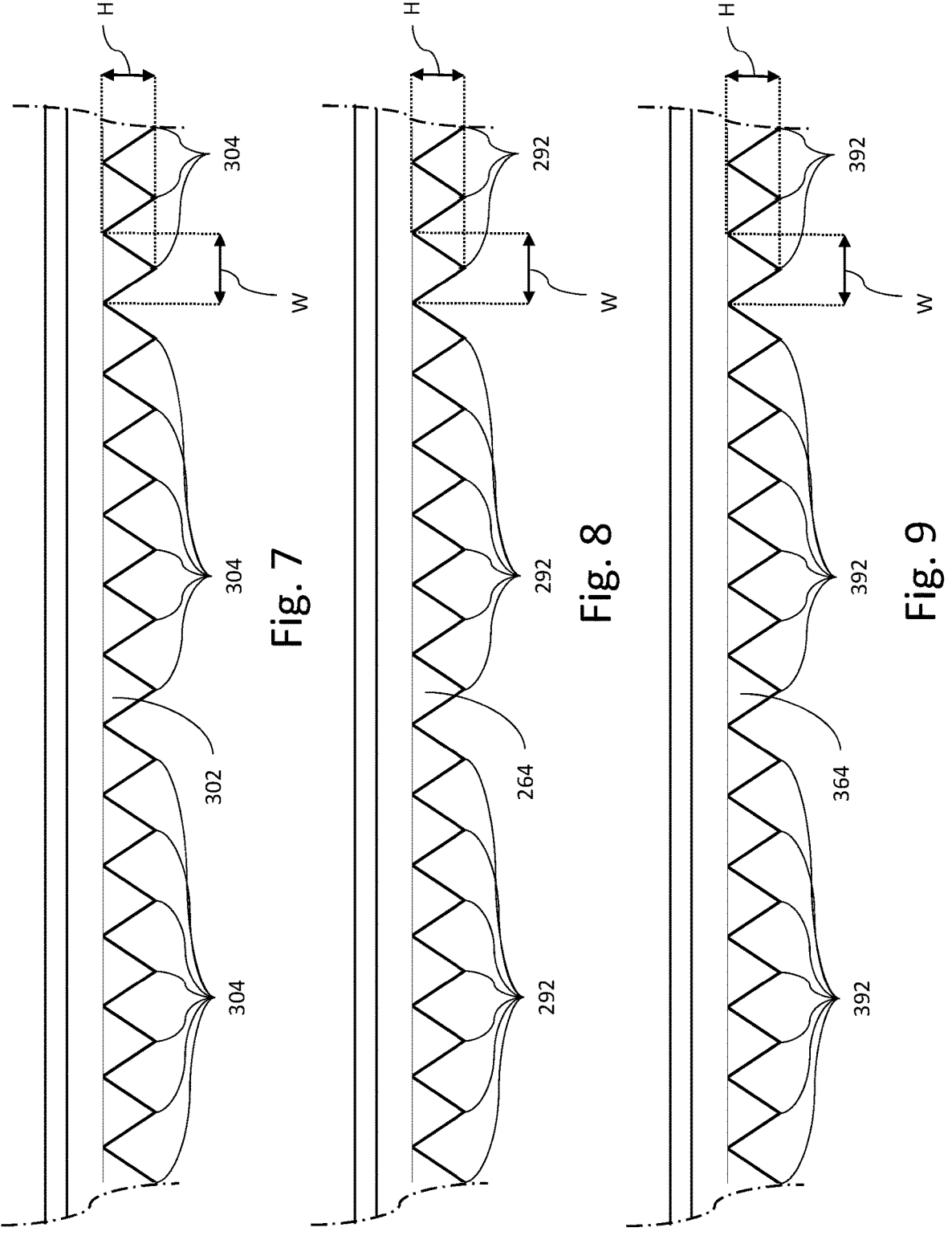
FIGS. 7, 8, and 9 are partially diagrammatic rear views of example ground-engaging rake portions of spoils rakes of the example system of FIG. 1.

The range of movement of spoils rake 207 may be defined in part by interaction of limiter arm 265 with upper stop 267 and lower stop 268 of receiver 266. For example, as illustrated in FIG. 6, limiter arms may move between a lower position at which limiter arm 265 contact lower stop 268 as illustrated in solid lines and an upper position at which limiter arm 265 contacts upper stop 267 as illustrated in phantom dashed lines labeled with reference numeral 266. The positioning of upper stop 267 and lower stop 268 relative to receive 266 may be varied to change the range of motion of limiter arm 265 and other structures of spoils rake 207.

Spoils rake 307 includes a pivot arms 362 which are coupled with rearward portion 210 of frame assembly 202 at respective rake joints 363. Pivot arms 362 extend rearward from the rake joints 363 and are rotatable along with the other structures of spoils rake 307 about axes through rake joints 363 generally extending in the illustrated X-axis direction.

Rake joints 363 are preferably provided and configured as play-added joints wherein a first joint member is undersized or oversized relative to a second joint member providing one or more additional degrees or freedoms of relative motion between the first joint member and the second joint member in addition to the aforementioned rotational degree or freedom of relative motion. For example, as illustrated in FIGS. 10-12, pivot pins 363' extend through apertures in respective pairs of rake joints 363 and distal ends of pivot arms 362. The sizing of at least one of the apertures in rake joints 363 and distal ends of pivot arms 362 is substantially larger than the diameter or maximum received dimension of pivot pins 363' providing a degree or freedom of motion in addition to rotation of pivot arms 362 relative to rake joints 363.

Spoils rake 307 further includes a ground-engaging rake portion 364 (also referred to herein as rake portion 364) which is coupled with and extends downward from the pivot arms 362. Rake portion 364 includes a plurality of triangular ground engaging teeth 392. Ground engaging teeth 392 are preferably configured and provided with preferred dimensions providing unique performance with respect to spoils sifting. In certain preferred forms, ground engaging teeth 392 have a height H of 1.75 inches and a width W of 2 inches. In certain preferred forms, ground engaging teeth 304 have a height H between 1.58 inches and 1.93 inches inclusive and a width W between 1.8 inches and 2.2 inches inclusive.

Spoils rake 307 includes a limiter arm 365 which is coupled with and extends rearward from rake portion 364. Limiter arm 365 is received in a limiter arm receiver 366. In the illustrated embodiment, limiter arm receiver 366 includes spaced-apart elongate vertical members defining a slot there between. A plurality of apertures are defined in the spaced-apart elongate vertical members and are sized and configured to receive upper stop 367 and lower stop 368 and various selectable locations along the height of the spaced-apart elongate vertical members. Upper stop 367 and lower stop 368 delimit a range of motion over which limiter arm 365 can travel.

Upper stop 367 and lower stop 368 are operator-adjustable to a plurality of positions defining different stop heights for the motion of limiter arm 365 and spoils rake 307. By adjusting the apertures in which upper stop 367 is placed, an operator can vary the maximum heights for the motion of limiter arm 365 and spoils rake 307 established by upper stop 367. By removing upper stop 367 entirely, such maximum height can be unlimited by interaction of limiter arm 365 and upper stop 367. By selectably adjusting the apertures in which lower stop 368 is placed, an operator can vary the minimum heights for the motion of limiter arm 365 and spoils rake 307 established by lower stop 368. By removing lower stop 368 entirely, such minimum height can be unlimited by interaction of limiter arm 365 and lower stop 368.

Spoils rake 307 includes side wall 369 which extends in a forward direction of rake portion 364 and extends in a vertical direction with rake portion 364 extending vertically lower than side wall 369. Side wall 369 provides containment of spoils captured by rake portion 364. Spoils rake 307 further includes lateral rods 371, 372 which are coupled with and positioned above pivot arms 362 and are spaced apart from one another and positioned to provide additional sifting of soil carried by spoils rake 307 and limiting passage of spoils over the top of spoils rake 307.

The range of movement of spoils rake 307 may be defined in part by interaction of limiter arm 365 with upper stop 367 and lower stop 368 of receiver 366. For example, limiter arm 365 may move between a lower position at which limiter arm 365 contact lower stop 368 and an upper position at which limiter arm 365 contacts upper stop 367. The positioning of upper stop 367 and lower stop 368 relative to receive 366 may be varied to change the range of motion of limiter arm 365 and other structures of spoils rake 307.

Spoils rake 207 and a spoils rake 307 are preferably adjustable and moveable independently from one another relative to rearward portion 210 of frame assembly 202. For example, upper stop 267 and upper stop 367 may be adjusted to different Z-axis positions (or to different inserted/removed positions) to provide different upper limits on the motion of spoils rake 207 and spoils rake 307, respectively. Likewise, lower stop 268 and lower stop 368 may be adjusted to different Z-axis positions (or to different inserted/removed positions) to provide different lower limits on the motion of spoils rake 207 and spoils rake 307, respectively.

The independent adjustment and movement of spoils rake 207 and a spoils rake 307 is further illustrated, for example, in FIGS. 10-12. FIG. 10 illustrates spoils rake 207 and a spoils rake 307 in substantially similar positions in the Z axis direction and in substantially similar working position on a generally uniformly flat underlying ground surface GS. As attachment 200 is towed or otherwise advanced, spoils rake 207 and a spoils rake 307 may encounter regions of non-uniformity of underlying ground surface may adjust and move independently.

As shown in FIG. 11 spoils rake 307 has moved to a substantially different positions in the Z axis direction relative to spoils rake 207 in response to an underlying ground surface GS' having a higher Z-axis elevation below spoils rake 307 than below spoils rake 207. The different Z-axis elevations of spoils rake 207 and spoils rake 307 may occur at least in part in response to different degrees of motion of pivot arms 362 relative to rake joints 363 on the one hand than the motion of pivot arms 262 relative to rake joints 263. Such independent motion contributes spoils rake 207 and spoils rake 307 to ride over and adjust to contour or elevation changes in the underlying ground surface. It shall appreciated that the illustrated position is but one example of the independent elevation of different positions in the Z axis direction due at least in part to the aforementioned motion, it being contemplated that such independent motion could occur over the full range of motion for spoils rake 207 and full range of motion for spoils rake 307 established by their respective limiting arms. It shall be appreciated that the motion of spoils rake 307 between the positions of FIGS. 10 and 11 is one example of a spoils rake being rotatable relative to a frame member with which it is coupled.

As shown in FIG. 12 spoils rake 307 has moved to a substantially different angles as spoils rake 207 relative to the X axis in response to an underlying ground surface GS" having a slope rise under spoils rake 307. The different Z-axis elevations of spoils rake 207 and spoils rake 307 may occur at least in part in response to different degrees of play-added motion of each of pivot arms 362 relative to their respective joints 363. Such play added motion may include motion of a first joint member which is undersized or oversized relative to a second joint member providing one or more additional degrees or freedoms of relative motion between the first joint member and the second joint member in addition to the rotational degree or freedom of relative motion. For example, as illustrated in FIG. 12, the distal ends of pivot arms 362 have moved to different positions relative to their respective pivot pins 363' such that spoils rake is at a non-parallel angle relative to the X-axis. In some embodiments, the play-added features motion of spoils rakes 207 and 307 may provide angling of spoils rakes 207 and 307 of +/−2.5 degrees or more. In some embodiments, the play-added features motion of spoils rakes 207 and 307 may provide angling of spoils rakes 207 and 307 of +/−5 degrees or more. It shall be appreciated that the motion of pivot arms 362 relative to their respective joints 363 is independent of the motion of pivot arms 262 relative to rake joints 263. Such independent motion contributes spoils rake 207 and spoils rake 307 to ride over and adjust to contour or elevation changes in the underlying ground surface. It shall be appreciated that the motion of spoils rake 307 between the positions of FIGS. 10 and 12 is one example of a spoils rake being tiltable relative to a frame member with which it is coupled.

The motion and adjustment of FIGS. 11 and 12 are not excusive and may occur in combination depending on variation in the underlying ground surface. Furthermore, while spoils rake 207 is illustrated as having the same position and Z-axis elevation in FIGS. 10-12, it shall be appreciated that spoils rake 207 may also move and adjust in substantially the same manners as described in connection with spoils rake 307. It shall be appreciated that the independent motion and adjustment of spoils rakes 207 and 307 allows the spoils rake assembly 206 to adjust to variation in the underlying ground surface to provide a floating type motion and degree of working responsive to changes in the contour of the underlying grounds surface.

As noted above, lift mechanism 120 is adjustably coupled with chassis 102 and is adjustable to a plurality of Z-axis positions. In the illustrated embodiment, the lift mechanism

120 includes an actuator 122 in the form of a hydraulic cylinder which is coupled with a lifting arm 114 at a joint 107 permitting rotation of the actuator 122 relative to the lifting arm 114. The actuator 122 is also coupled with a vertically extending operator support member 127 provided on chassis 102 of the work machine 100 at a joint 103 permitting rotation of the actuator 122 relative to the operator support member 127. The lifting arm 114 is coupled with chassis 102 of the work machine 100 at a joint 105 permitting rotation of the lifting arm 114 relative to the chassis 102. In the illustrated embodiment, the joints 103, 105, 107 are provided as hinge-type joints, it being appreciated that other types of joints permitting the described relative rotation of the aforementioned coupled structures may be utilized in other embodiments.

The lifting arm 114 and the actuator 122 are examples of a lift arm rotatably coupled with a work machine and an actuator rotatably coupled with the lift arm and the work machine, the actuator being actuatable to rotate the lift arm to the plurality of Z-axis positions. Other embodiment may additionally or alternatively comprise other types of such lifting arms and lifting arm arrangements, for example, lifting arms with differently-arranged joints or fulcrums, vertically translating arms, vertically extensible and retractable arms, and other types of lift arms as will occur to one of skill in the art with the benefit of the present disclosure. Other embodiment may additionally or alternatively comprise other types of actuators, for example, linear motor actuators, rotary motor actuators, manually driven actuators, pneumatically drive actuators, electromagnetic actuators, or other types of actuators as will occur to one of skill in the art with the benefit of the present disclosure.

Lift mechanism 120 is one example of a lift mechanism that is adjustable to a raised position in which attachment 200 is raised above the underlying ground surface GS and is supported by the flexible riggings 136a, 136b. It shall be appreciated that other embodiments may comprise other types of lift mechanisms, for example, jack devices such as arm type, bottle-type, scissor-type, and other jack types, mechanical linkages, additional or hydraulic or pneumatic adjustment mechanisms, rack, and pinion mechanisms, ratchet mechanisms, screw mechanisms, winch devices including a spool rotatable to wind and unwind a line or other flexible rigging member or other types of lifting members as will occur to one of skill in the art with the benefit of the present disclosure.

A first flexible rigging 136a is coupled with and extends between the lifting arm 114 and a first coupling 136a' of the frame assembly 202 of attachment 300. In the illustrated embodiment a second flexible rigging 136b is coupled with and extends between the lifting arm 114 and a second coupling 136b' of the frame assembly 202 of attachment 300. In other embodiments, a single flexible rigging may be utilized or more than two flexible rigging members may be utilized. In the illustrated embodiment, the flexible riggings 136a and 136b comprise lengths of chain. In other embodiments, the flexible riggings 136a and 136b may comprise cables, lines, ropes, wires, or other types of flexible riggings. It shall be appreciated that first coupling 136a' and second coupling 136b' are examples of a coupling positioned rearward of a first joint portion of a frame such as joint portion 232a' and a second joint portion of a frame such as joint portion 232b' and configured to couple with a lift mechanism and to receive lifting force effective to rotate the forward portion relative to a first complimentary joint portion such as joint portion 109a and a second complimentary joint portion such as joint portion 109b.

The actuator 122 may be adjusted by operator controls 23 of the work machine 100 which are provided in or proximate an operator cockpit or station and are oriented for manipulation by a human operator facing the front end of the work machine. The operator controls 23 may be operated to selectably supply pressurized hydraulic fluid to the actuator 122 via hydraulic fluid lines (not illustrated) to expand or contract the length of the actuator 122. In other embodiments, the actuator 122 may be another type of controllable actuator such as an electrically driven controllable actuator or, in principle, a manually driven actuator. Operation of the operator controls 23 to expand the actuator 122 controls the lifting arm 114 to rotate about the joint 105 in a clockwise direction. Operation of the operator controls 23 to contract the actuator 122 controls the lifting arm 114 to rotate about the joint 105 in a counterclockwise direction.

Adjustment of the actuator 122 by operator controls 23 may be performed to raise and lower attachment 200 relative to an underlying ground surface GS. Starting with the lifting arm 114 in a lowered position with attachment 300 in contact with the underlying ground surface GS (e.g., the position illustrated in FIG. 4 or other lowered positions), operation of the operator controls 23 to contract the actuator 122 rotates the lifting arm 114 in the counterclockwise direction to take up any slack present in the flexible riggings 136*a*, 136*b* and, once the flexible riggings 136*a*, 136*b* are taut, to raise attachment 300 above the underlying ground surface GS. Such adjustment of the actuator 122 may be performed to raise attachment 300 to a number of raised positions wherein attachment 300 is raised above and spaced apart from the underlying ground surface GS (e.g., the position illustrated in FIG. 5 or other raised positions).

Figure 4:
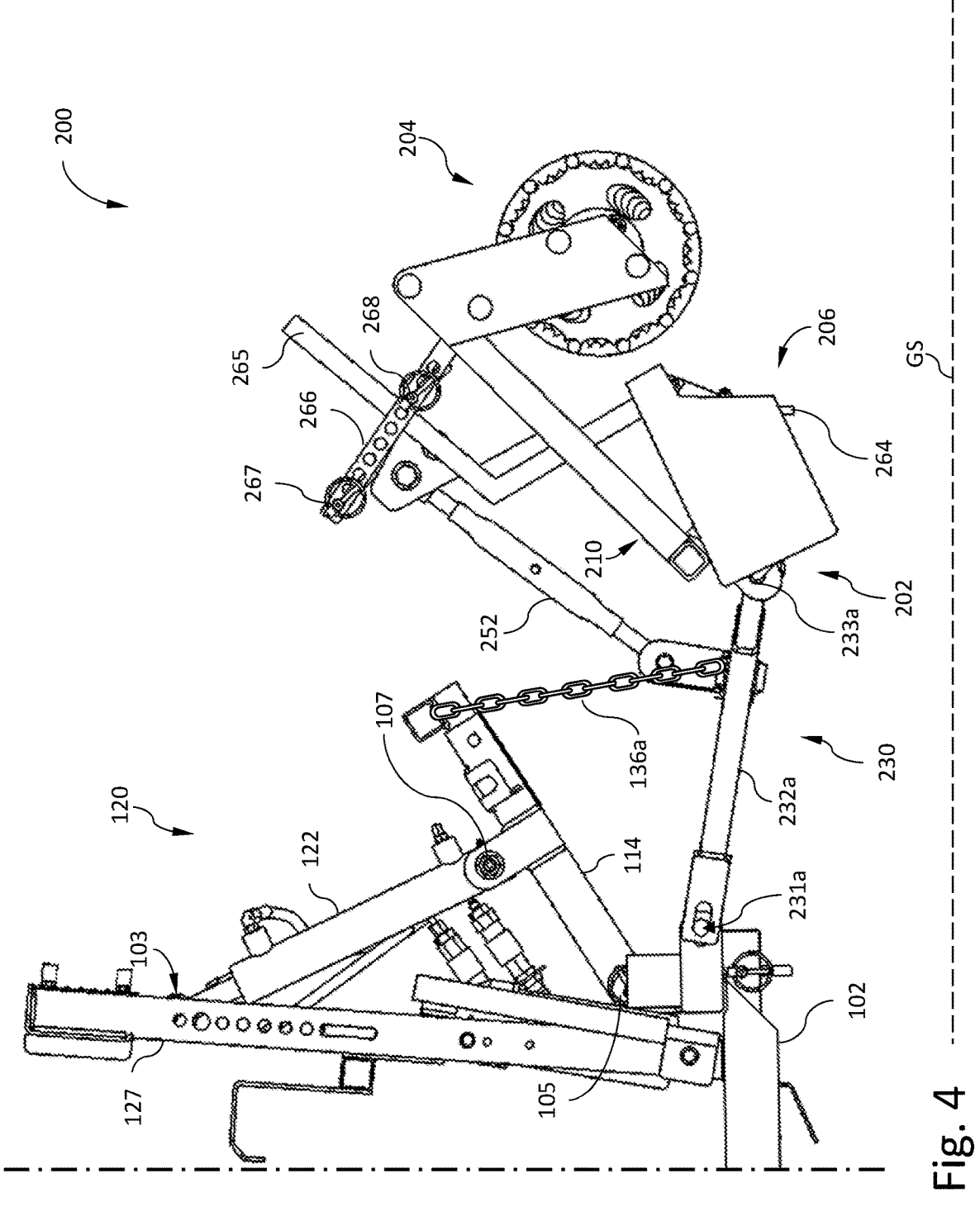
FIGS. 4, 5, and 6 are side views of a portion of the example system of FIG. 1 illustrating a several states of adjustment.

Lift mechanism 120 is adjustable to any of a plurality of a raised position in which frame assembly 202 is rotated so that attachment 300 is raised above the underlying ground surface GS and the flexible riggings 136*a*, 136*b* are taut and support weight of attachment 200, for example, the position illustrated in FIG. 4 or other raised positions. In a raised position, top link 252 may be adjusted to increase or decrease in length effective to increase or decrease, respectively an angle between rearward portion 210 and forward portion 230 of frame assembly 202 which increase or decrease may be independent from the position of forward portion 230 relative to chassis 102, and independent of the state of adjustment of spoils rake assembly 206.

Figure 5:
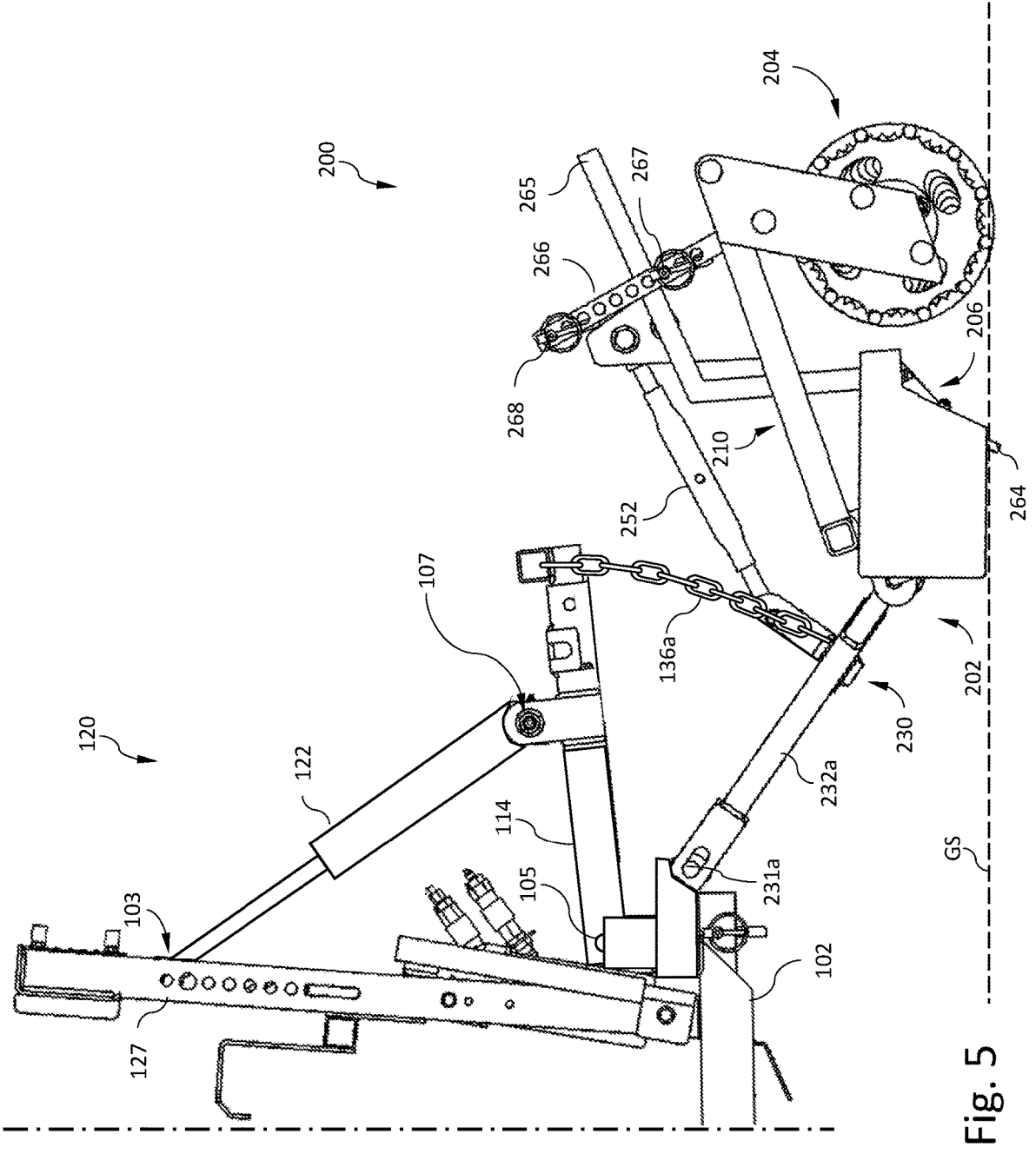

Lift mechanism 120 is further adjustable to any of a plurality of lowered position in which the frame assembly 202 is rotated so that attachment 300 contacts the underlying ground surface GS and the flexible riggings 136*a*, 136*b* are relaxed, slack, or otherwise do not support any of weight of attachment 200, for example, the positions illustrated in FIG. 5 or FIG. 6, or other lowered positions. It shall be appreciated that the positions illustrated in FIG. 5 or FIG. 6, or other lowered positions wherein the lift mechanism 120 is adjusted to the first position and frame assembly 202 is rotated so that the one or both of roller assembly 204 and spoils rake assembly 206 contacts the underlying ground surface GS, are examples of ground surface working positions according to the present disclosure.

A number of ground surface working positions and states of attachment 200 are contemplated. FIG. 5 illustrates an example ground surface working position wherein the lift mechanism 120 is lowered such that that roller assembly 204 and spoils rake assembly 206 contact the underlying ground surface GS and the flexible riggings 136*a*, 136*b* are slack or relaxed. In the illustrated ground surface working position, the roller assembly 204 supports the attachment on the underlying ground surface GS and spoils rake assembly 206 moveably engages the underlying ground surface GS such that spoils rake assembly 206 selectively penetrates the underlying ground surface to a variable degree and is provided with a degree of float movement as attachment 200 is advanced in a forward direction.

It shall be appreciated that number of structural components or elements disclosed herein are described as being attached, coupled, or joined to one another or as attaching, coupling, or joining other structural components or elements which shall be understood to encompass a number of attachments, coupling, or joining structures and techniques, for example, adhesion, bolting, bonding, brazing, clamping, formation as an integral or unitary structure with coupled portions, screwing, riveting, welding or other attachment, coupling or joining techniques as will occur to one of skill in the art with the benefit of the present disclosure except as otherwise expressly or logically limited or excluded. The assemblies of components disclosed herein are likewise understood to encompass such attachment or coupling structures and techniques except as otherwise expressly or logically limited or excluded.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
  a self-propelled work machine including a chassis, a plurality of ground-contacting members rotatably coupled with the chassis, and a lift mechanism adjustably coupled with the chassis and being adjustable to a plurality of vertical positions relative to the chassis; and
  a tow-behind attachment positioned rearward of the work machine and including a frame assembly, a spoils rake assembly, and a cage roller assembly,
  the frame assembly including a forward portion and a rearward portion,
  the forward portion being coupled with the chassis and coupled with and moveable by the lift mechanism to a plurality of positions relative to the chassis,
    the rearward portion being coupled with and moveable to a plurality of positions relative to the forward portion independent of movement of the forward portion relative to the chassis,
  the spoils rake assembly being coupled with and extending downward from the rearward portion at a position forward of the cage roller assembly and being moveable vertically relative to the rearward portion, and the cage roller assembly being rotatably coupled with and extending downward from the rearward portion of the frame assembly at a location rearward of the spoils rake assembly;

wherein the spoils rake assembly includes a plurality of pivot arms coupled with the rearward portion at a respective plurality of rake joints and extending rearward from the plurality of rake joints, and a ground-engaging rake body coupled with and extending downward from the plurality of pivot arms.

2. The apparatus of claim 1, wherein the spoils rake assembly includes a first spoils rake coupled with and extending downward from the rearward portion and a second spoils rake coupled with and extending downward from the rearward portion, the first spoils rake and the second spoils rake being movable relative to the rearward portion independently of one another.

3. The apparatus of claim 2, wherein the first spoils rake and the second spoils rake are rotatable to a plurality of Z-axis positions relative to the rearward portion independently of one another.

4. The apparatus of claim 2, wherein the first spoils rake and the second spoils rake are tiltable to a plurality of angles relative to the rearward portion independently of one another.

5. The apparatus of claim 1, wherein a pitch of the ground-engaging rake body is one of increased and decreased in response to movement of the rearward portion relative to the forward portion independent of movement of the forward portion relative to the chassis.

6. The apparatus of claim 1, wherein the spoils rake assembly includes a limiter arm extending rearward of the ground-engaging rake body, the spoils rake assembly being moveable relative to the rearward portion from a lowered position in which the limiter arm is spaced apart from an upper stop to a raised position in which the limiter arm contacts the upper stop.

7. The apparatus of claim 1, wherein the frame assembly includes a top link extending between and coupled with the forward portion and the rearward portion, the top link being extendable and retractable to vary the rotational position of the rearward portion relative to the forward portion.

8. The apparatus of claim 1, wherein the forward portion includes a first linking arm, a second linking arm, and a beam coupled with and extending between the first linking arm and the second linking arm, the first linking arm being coupled with the chassis at a first joint and moveable relative to the chassis about the first joint, the second linking arm being coupled with the chassis at a second joint and moveable relative to the chassis about the second joint.

9. The apparatus of claim 1, wherein the rearward portion is coupled with the forward portion at a third joint and a fourth joint and moveable relative to the forward portion about the third joint and the fourth joint.

10. An apparatus comprising:

a tow-behind attachment including a frame assembly, a spoils rake assembly, and a cage roller assembly, the frame assembly including a forward portion and a rearward portion, the forward portion including a plurality of joint portions configured to rotatably couple with complimentary joint portions of a work machine, the rearward portion being coupled with and moveable to a plurality of positions relative to the forward portion independent of movement of the forward portion relative to the complimentary joint portions, the spoils rake assembly being coupled with and extending downward from the rearward portion at a position forward of the cage roller assembly and being moveable vertically relative to the rearward portion, and the cage roller assembly being rotatably coupled with and extending downward from the rearward portion of the frame assembly at a location rearward of the spoils rake assembly;

wherein forward portion includes a first joint portion configured to mate with a first complimentary joint portion to form a first joint permitting rotation of the forward portion relative to the first complimentary joint portion, a second joint portion configured to mate with a second complimentary joint portion to form a second joint permitting rotation of the forward portion relative to the second complimentary joint portion, and a coupling positioned rearward of the first joint portion and the second joint portion and configured to couple with a lift mechanism and to receive lifting force effective to rotate the forward portion relative to the first complimentary joint portion and the second complimentary joint portion.

11. The apparatus of claim 10, wherein the spoils rake assembly includes a first spoils rake coupled with and extending downward from the rearward portion and a second spoils rake coupled with and extending downward from the rearward portion, the first spoils rake and the second spoils rake being movable relative to the rearward portion independently of one another.

12. The apparatus of claim 11, wherein the first spoils rake and the second spoils rake are rotatable to a plurality of Z-axis positions relative to the rearward portion independently of one another.

13. The apparatus of claim 11, wherein the first spoils rake and the second spoils rake are tiltable to a plurality of angles relative to the rearward portion independently of one another.

14. The apparatus of claim 10, wherein the spoils rake assembly includes a plurality of pivot arms coupled with the rearward portion at a respective plurality of rake joints and extending rearward from the plurality of rake joints, and a ground-engaging rake body coupled with and extending downward from the plurality of pivot arms.

15. The apparatus of claim 10, wherein the apparatus is coupled with a self-propelled work machine.

16. The apparatus of claim 15 wherein including a chassis, a plurality of ground-contacting members rotatably coupled with the chassis, and a lift mechanism adjustably coupled with the chassis and being adjustable to a plurality of vertical positions relative to the chassis.

17. An apparatus comprising:

a self-propelled work machine including a chassis, a plurality of ground-contacting members rotatably coupled with the chassis, and a lift mechanism adjustably coupled with the chassis and being adjustable to a plurality of vertical positions relative to the chassis; and a tow-behind attachment positioned rearward of the work machine and including a frame assembly, a spoils rake assembly, and a cage roller assembly, the frame assembly including a forward portion and a rearward portion, the forward portion being coupled with the chassis and coupled with and moveable by the lift mechanism to a plurality of positions relative to the chassis, the rearward portion being coupled with and moveable to a plurality of positions relative to the forward portion independent of movement of the forward portion relative to the chassis, the spoils rake assembly being coupled with and extending downward from the rearward portion at a position forward of the cage roller assembly and being moveable vertically relative to the rearward portion, and the cage roller assembly being rotatably coupled with and extending downward from the rearward portion of the frame assembly at a location rearward of the spoils rake assembly;

wherein the frame assembly includes a top link extending between and coupled with the forward portion and the rearward portion, the top link being extendable and retractable to vary the rotational position of the rearward portion relative to the forward portion.

18. The apparatus of claim 17, wherein the spoils rake assembly includes a first spoils rake coupled with and extending downward from the rearward portion and a second spoils rake coupled with and extending downward from the rearward portion, the first spoils rake and the second spoils rake being movable relative to the rearward portion independently of one another.

19. The apparatus of claim 17, wherein the first spoils rake and the second spoils rake are rotatable to a plurality of Z-axis positions relative to the rearward portion independently of one another.

20. The apparatus of claim 17, wherein the first spoils rake and the second spoils rake are tiltable to a plurality of angles relative to the rearward portion independently of one another.

21. An apparatus comprising:

a self-propelled work machine including a chassis, a plurality of ground-contacting members rotatably coupled with the chassis, and a lift mechanism adjustably coupled with the chassis and being adjustable to a plurality of vertical positions relative to the chassis; and a tow-behind attachment positioned rearward of the work machine and including a frame assembly, a spoils rake assembly, and a cage roller assembly, the frame assembly including a forward portion and a rearward portion, the forward portion being coupled with the chassis and coupled with and moveable by the lift mechanism to a plurality of positions relative to the chassis, the rearward portion being coupled with and moveable to a plurality of positions relative to the forward portion independent of movement of the forward portion relative to the chassis, the spoils rake assembly being coupled with and extending downward from the rearward portion at a position forward of the cage roller assembly and being moveable vertically relative to the rearward portion, and the cage roller assembly being rotatably coupled with and extending downward from the rearward portion of the frame assembly at a location rearward of the spoils rake assembly;

wherein the forward portion includes a first linking arm, a second linking arm, and a beam coupled with and extending between the first linking arm and the second linking arm, the first linking arm being coupled with the chassis at a first joint and moveable relative to the chassis about the first joint, the second linking arm being coupled with the chassis at a second joint and moveable relative to the chassis about the second joint.

22. The apparatus of claim 21, wherein the spoils rake assembly includes a first spoils rake coupled with and extending downward from the rearward portion and a second spoils rake coupled with and extending downward from the rearward portion, the first spoils rake and the second spoils rake being movable relative to the rearward portion independently of one another.

23. The apparatus of claim 21, wherein the first spoils rake and the second spoils rake are rotatable to a plurality of Z-axis positions relative to the rearward portion independently of one another.

24. The apparatus of claim 21, wherein the first spoils rake and the second spoils rake are tiltable to a plurality of angles relative to the rearward portion independently of one another.

25. An apparatus comprising:

a self-propelled work machine including a chassis, a plurality of ground-contacting members rotatably coupled with the chassis, and a lift mechanism adjustably coupled with the chassis and being adjustable to a plurality of vertical positions relative to the chassis; and a tow-behind attachment positioned rearward of the work machine and including a frame assembly, a spoils rake assembly, and a cage roller assembly, the frame assembly including a forward portion and a rearward portion, the forward portion being coupled with the chassis and coupled with and moveable by the lift mechanism to a plurality of positions relative to the chassis, the rearward portion being coupled with and moveable to a plurality of positions relative to the forward portion independent of movement of the forward portion relative to the chassis, the spoils rake assembly being coupled with and extending downward from the rearward portion at a position forward of the cage roller assembly and being moveable vertically relative to the rearward portion, and the cage roller assembly being rotatably coupled with and extending downward from the rearward portion of the frame assembly at a location rearward of the spoils rake assembly;

wherein the rearward portion is coupled with the forward portion at a third joint and a fourth joint and moveable relative to the forward portion about the third joint and the fourth joint.

26. The apparatus of claim 25, wherein the spoils rake assembly includes a first spoils rake coupled with and extending downward from the rearward portion and a second spoils rake coupled with and extending downward from the rearward portion, the first spoils rake and the second spoils rake being movable relative to the rearward portion independently of one another.

27. The apparatus of claim 25, wherein the first spoils rake and the second spoils rake are rotatable to a plurality of Z-axis positions relative to the rearward portion independently of one another.

28. The apparatus of claim 25, wherein the first spoils rake and the second spoils rake are tiltable to a plurality of angles relative to the rearward portion independently of one another.

29. An apparatus comprising:

a self-propelled work machine including a chassis, a plurality of ground-contacting members rotatably coupled with the chassis, and a lift mechanism adjustably coupled with the chassis and being adjustable to a plurality of vertical positions relative to the chassis; and a tow-behind attachment positioned rearward of the work machine and including a frame assembly, a spoils rake assembly, and a cage roller assembly, the frame assembly including a forward portion and a rearward portion, the forward portion being coupled with the chassis and coupled with and moveable by the lift mechanism to a plurality of positions relative to the chassis, the rearward portion being coupled with and moveable to a plurality of positions relative to the forward portion independent of movement of the forward portion relative to the chassis, the spoils rake assembly being coupled with and extending downward from the rearward portion at a position forward of the cage roller assembly and being moveable vertically relative to the rearward portion, and the cage roller assembly being rotatably coupled with and extending downward from the rearward portion of the frame assembly at a location rearward of the spoils rake assembly;

wherein the spoils rake assembly includes a first spoils rake coupled with and extending downward from the rearward portion and a second spoils rake coupled with and extending downward from the rearward portion, the first spoils rake and the second spoils rake being movable relative to the rearward portion independently of one another, and wherein at least one of: (a) the first spoils rake and the second spoils rake are rotatable to a plurality of Z-axis positions relative to the rearward portion independently of one another, and (b) the first spoils rake and the second spoils rake are tiltable to a plurality of angles relative to the rearward portion independently of one another.

* * * * *